United States Patent [19]
Haggard

[11] Patent Number: 5,732,442
[45] Date of Patent: Mar. 31, 1998

[54] TRAILER ENTRY HANDLE

[75] Inventor: Michale W. Haggard, Ardmore, Okla.

[73] Assignee: Antec Fabrication, Inc., Springer, Okla.

[21] Appl. No.: 749,421

[22] Filed: Nov. 15, 1996

[51] Int. Cl.[6] .................................................... A47B 95/02
[52] U.S. Cl. ........................................ 16/110 R; 16/114 R
[58] Field of Search ............................... 16/110 R, 111 R, 16/114 R, 125, 126, DIG. 41; 294/15, 16, 165, 170, 231.7

[56] References Cited

U.S. PATENT DOCUMENTS

| | | | |
|---|---|---|---|
| D. 317,279 | 6/1991 | Krueger | D12/106 |
| 2,447,389 | 8/1948 | Borchers | 16/114 |
| 2,586,986 | 2/1952 | Orrison | 105/354 |
| 2,620,955 | 12/1952 | Elder | 224/45 |
| 3,582,124 | 6/1971 | Quirk, Jr. | 294/26 |
| 4,184,568 | 1/1980 | Hillier | 182/8 |
| 4,817,239 | 4/1989 | Campbell et al. | 16/114 R |
| 4,831,688 | 5/1989 | Deininger | 16/319 |
| 5,027,471 | 7/1991 | Barnes | 16/86 R |
| 5,044,681 | 9/1991 | Neighbors | 292/288 |
| 5,117,532 | 6/1992 | Holland | 16/250 |
| 5,323,511 | 6/1994 | Gray | 16/114 R |
| 5,450,652 | 9/1995 | Webb | 16/82 |
| 5,511,837 | 4/1996 | Dempsey et al. | 292/288 |

*Primary Examiner*—Chuck Mah
*Attorney, Agent, or Firm*—Dougherty & Hessin, P.C.

[57] ABSTRACT

A portable handle for facilitating entry into and exit from a trailer is provided. The handle comprises a base that includes a top, a bottom, an inside surface and an outside surface. A hook is attached to the inside surface of the base and extends outwardly therefrom. A handle member is attached to the outside surface of the base. In using the handle, the operator places the hook over the trailer (e.g. over a door hinge) to removably couple the handle to the trailer. The user can then grasp the handle member and pull himself or herself in and out of the trailer.

24 Claims, 4 Drawing Sheets

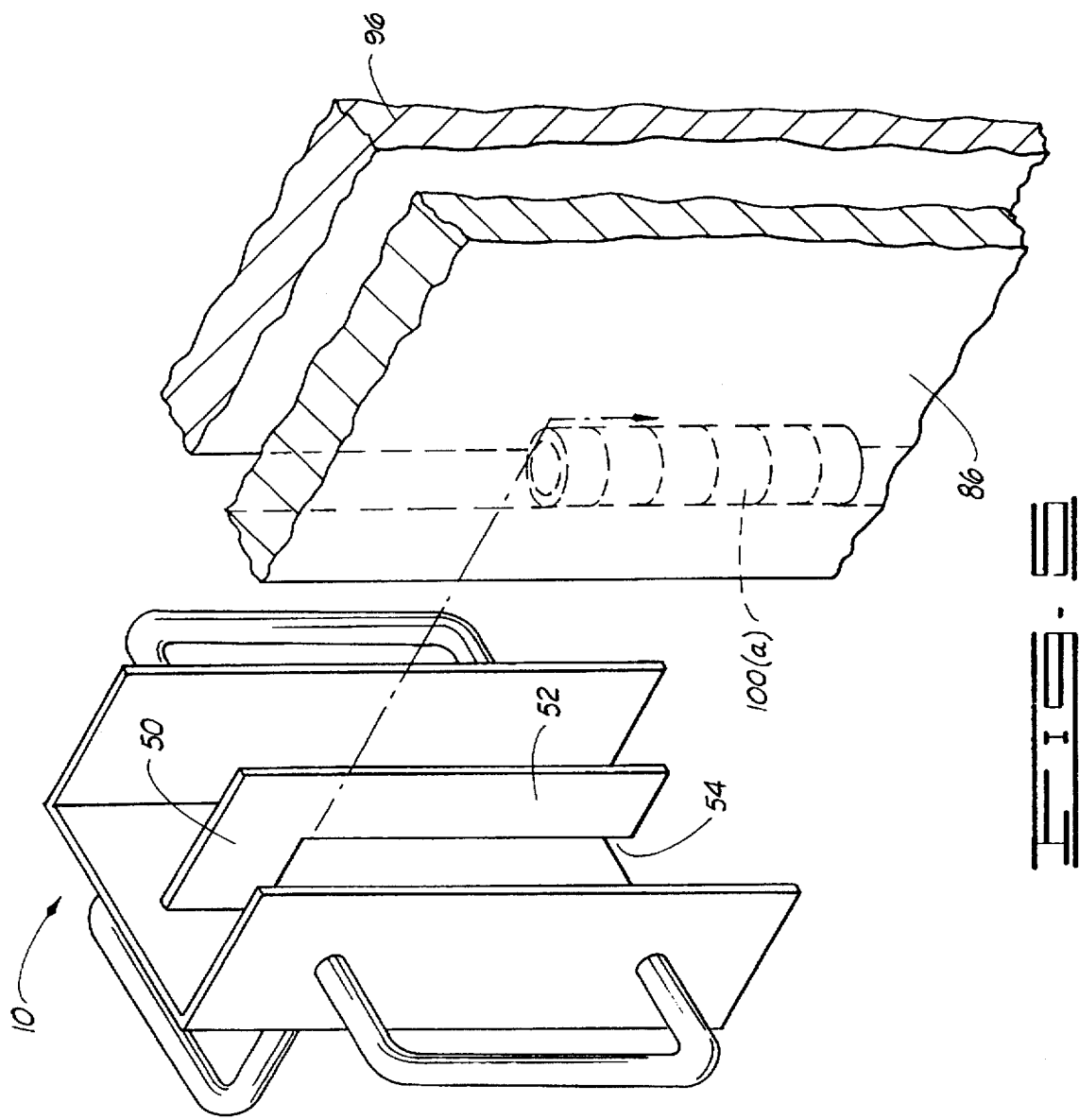

TRAILER ENTRY HANDLE

BACKGROUND OF THE INVENTION

This invention relates generally to handles that may be grasped or held by the hand, and more particularly, but not by way of limitation, to such handles designed specifically for use in facilitating entry into and exit from vehicles.

Van trailers are very commonly used to transport goods and animals on the open road. Such trailers, which come in various shapes and sizes, are generally hauled by trucks or tractors. A typical van trailer includes a large interior fully enclosed by a metal body. Access to the interior of the trailer is gained byway of one or more doors in the trailer body. For example, many van trailers include a pair of rear cargo doors pivotally mounted in a vertical orientation to the side walls of the trailer body.

Unfortunately, getting in and out of many van trailers is a difficult task. A large number of van trailers, particularly those including rear cargo doors, are designed for use with loading docks and do not include ramps or steps to facilitate access. In order to enter such a trailer from the ground, one must grab the slick floor and try to balance himself or herself while climbing on to the rear bumper and into the trailer. A similar procedure must be used to get out of the trailer. Many people have slipped and sustained serious injuries by climbing in and out of trailers in this way.

There is a need for apparatus that can be used to facilitate entry into and exit from the interior of a van trailer when a loading dock is not available.

SUMMARY OF THE INVENTION

In accordance with the present invention, a portable handle for facilitating entry into and exit from a trailer is provided. The handle comprises a base that includes a top, a bottom, an inside surface and an outside surface. Hook means are attached to the inside surface of the base and extend outwardly therefrom for removably hooking the base to a trailer. A handle member is attached to the outside surface of the base.

The handle is portable in the sense that it is not permanently attached to a trailer. For example, the handle can be stored in the cab of a truck and used as needed in association with the particular trailer being hauled at the time. In use, the operator merely couples the hook means to the trailer in a position adjacent the trailer door. The operator can then grasp the handle while climbing in and out of the trailer.

The inventive handle is particularly useful for facilitating entry into and exit from the interior of a trailer of a type having a body and at least one door vertically and pivotally mounted to the body by at least one hinge unit. The hook means is a hook designed to fit over the hinge unit when the door is open. The hook is inserted between the open door and the outside surface of the side wall of the trailer. In this embodiment, the handle also serves as a handy door stop and will not allow the open door to be blown shut.

In one embodiment, the base includes a center member and at least one arm member attached to the center member, the arm member extending outwardly from the center member alongside the hook. The arm member abuts against the open door thereby stabilizing the handle while in use. The arm member also facilitates use of the handle as a door stop by holding the door open against the side wall of the trailer. In this embodiment, the handle preferably includes both a handle member attached to the outside surface of the center member and a handle member attached to the outside surface of the arm member.

It is, therefore, an object of the present invention to provide a portable handle that can be used to facilitate entry into and exit from the interior of a trailer.

It is also an object of the present invention to provide such a handle that is durable and simple in construction and can be used in association with various shapes and sizes of trailers.

An additional object of the present invention is to provide a portable handle for facilitating entry into and exit from a trailer that also serves as a door stop when inserted over a door hinge.

Additional objects, features and advantages of the present invention will be readily apparent to those skilled in the art upon a reading of the detailed description of preferred embodiments of the invention which follows when taken in conjunction with the accompanying drawings.

BRIEF DESCRIPTION OF THE SEVERAL VIEWS OF THE DRAWING

FIG. 5 and FIG. 6 are exploded partial sectional views of the van trailer illustrated by FIG. 4 showing operation of the embodiment of the inventive handle shown by FIG. 1 in more detail.

Figure 1:
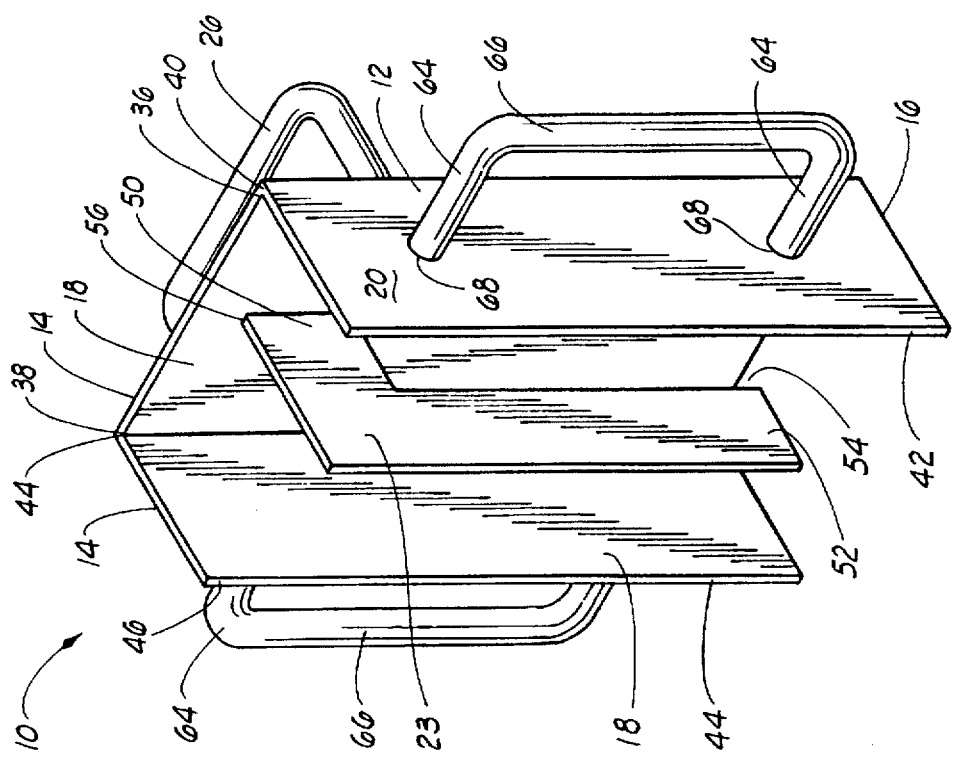
FIG. 1 is a front perspective view of a preferred embodiment of the inventive handle.
Figure 2:
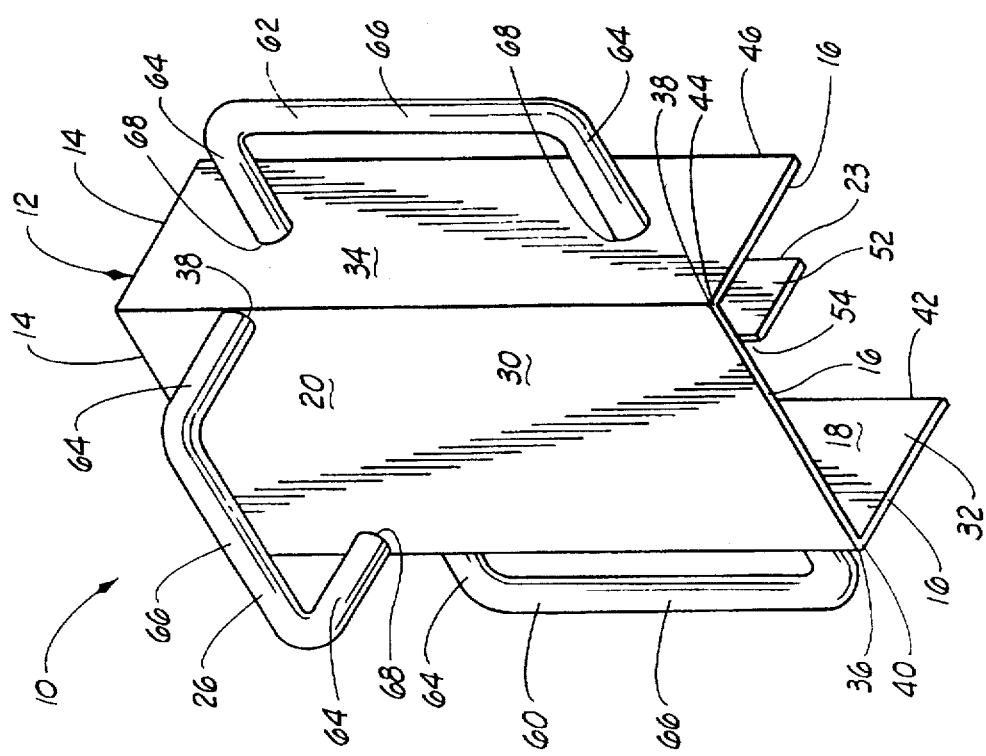
FIG. 2 is a rear perspective view of the embodiment of the inventive portable handle illustrated by FIG. 1.
Figure 3:
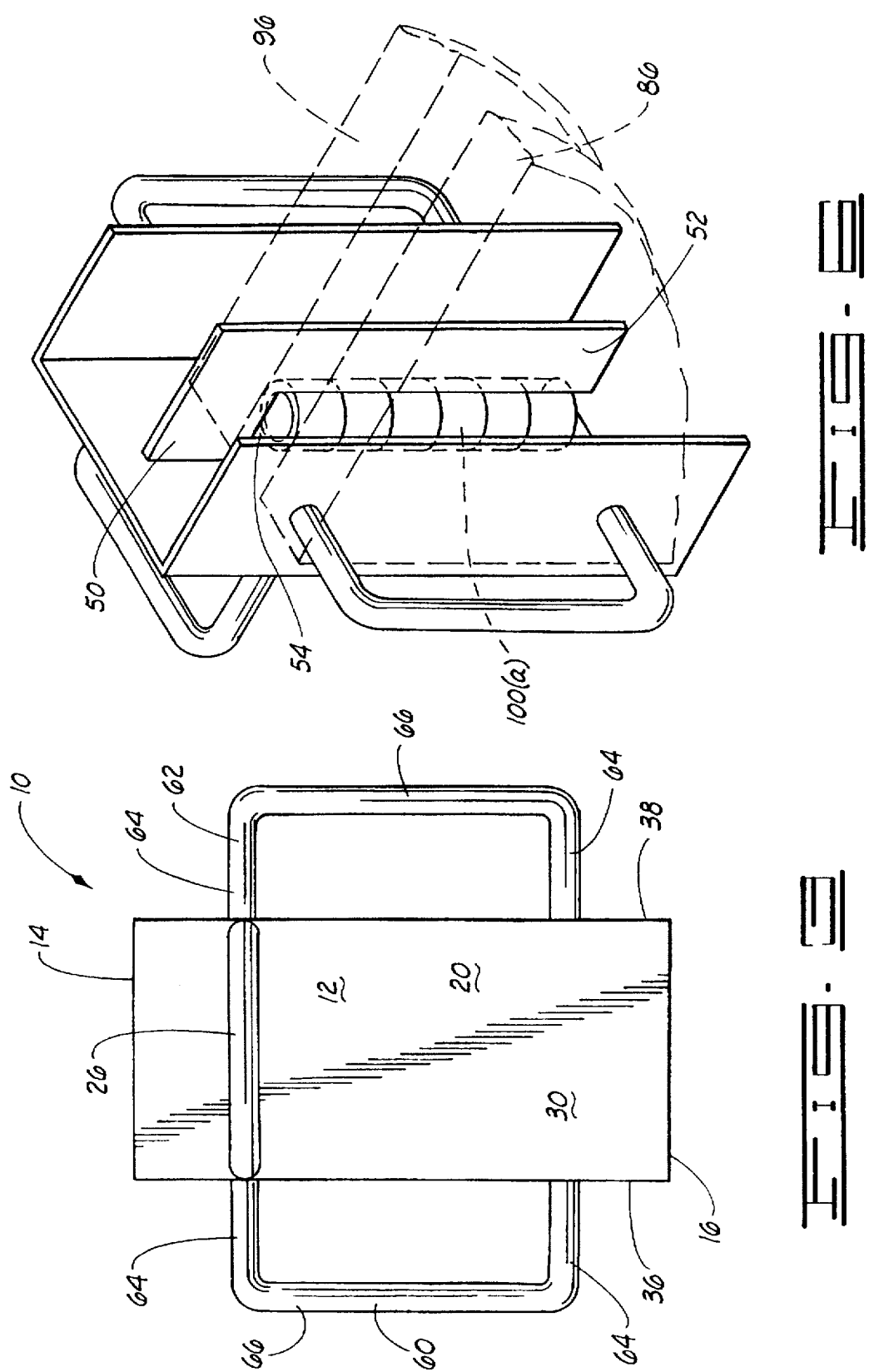
FIG. 3 is a front view of the embodiment of the inventive handle illustrated by FIG. 1.

DETAILED DESCRIPTION OF THE INVENTION:

Referring now to the drawings and particularly to FIGS. 1–3, a preferred embodiment of the inventive portable handle for facilitating entry into and exit from a van trailer is illustrated and generally designated by the numeral 10. The handle 10 includes a base 12, which includes a top 14, a bottom 16, an inside surface 18 and an outside surface 20. A hook 23 is attached to the inside surface 18 of the base 12 and extends outwardly therefrom for removably hooking the base to a trailer. A handle member 26 is attached to the outside surface 20 of the base 12.

The base 12 includes a center member 30 and a pair of arm members 32 and 34 attached to the center member. The arm members 32 and 34 are spaced apart and each perpendicularly extend outwardly from the center member 30. The center member 30 is a flat rectangular plate having a pair of opposed ends 36 and 38. The arm member 32 is a flat rectangular plate having a pair of opposed ends 40 and 42. The arm member 34 is a flat rectangular plate having pair of opposed ends 44 and 46. The center member 30 and arm members 32 and 34 each have the same length from the top 14 to the bottom 16 thereof. The end 40 of the arm member 32 is attached to the end 36 of the center member 30, and the end 44 of the arm member 34 is attached to the end 38 of the center member. The center member 30 and arm members 32 and 34 are integrally formed out of steel as a one piece unit by a brake press having a V-die.

The hook 23 is adapted to be removably placed over a hinge unit that vertically and pivotally mounts a cargo door to a trailer body of a trailer. When placed over such a hinge unit, the hook 23 temporarily couples the base 12 to the trailer. Of course, the hook only fits over the hinge unit when the cargo door is open.

The hook 23 includes an extension member 50 attached to the inside surface 18 of the center member 30 adjacent the top 14 of the center member and perpendicularly extending outwardly from the center member, and a leg member 52 attached to and perpendicularly extending from the extension member toward the bottom 16 of the center member. The leg member 52 is spaced from the inside surface 18 of the center member 30 forming a space 54 for receiving the hinge unit or other structure of a trailer. The arm members 32 and 34 extend alongside the leg member 52 such that the hook 23 is centered between the arm members and partially encased by the base 12. The extension member 50 and leg member 52 of the hook 23 are integrally formed together as an L-shaped flat piece of steel. The extension member 50 is attached to the inside surface 18 of the center member 30 by welding an end 56 of the extension member to the inside surface of the center member.

The handle member 26 is attached to the outside surface 20 of the center member 30 of the base 12. A second handle member 60 is attached to the outside surface 20 of the arm member 32, and a third handle member 62 is attached to the outside surface 20 of the arm member 34. The handle members 26, 60 and 62 are each a U-shaped rod having a pair of spaced legs 64 and a cross bar 66 interconnecting the legs. The legs 64 of the handle member 26 are attached to the outside surface 20 of the center member 30. The legs 64 of the handle member 60 are attached to the outside surface 20 of the arm member 32. The legs 64 of the handle member 62 are attached to the outside surface 20 of the arm member 34. The legs 64 and cross bars 66 of each of the handles 26, 60 and 62 are integrally formed together. The legs 64 of the handle members 26, 60 and 62 are attached to the outside surface 20 of the base 12 by welding the ends 68 of the legs to the outside surface of the base 12.

The center member 30 of the base 12 of the handle 10 is typically about 5 inches wide, about 10 inches long and about ⅛ inch thick. The arm members 32 and 34 of the base 12 are each about 3 inches wide, about 10 inches long and about ⅛ inch thick (the base 12 is preferably formed out of 10 gauge steel). The legs 64 of the handle members 26, 60 and 62 are each about 2 inches long and ½ inch in diameter. The cross bar 66 of the handle member 26 is about 5 inches long and ½ inch in diameter. The cross bars 66 of the handle members 60 and 62 are each about 6 inches long and ½ inch in diameter. The extension member 50 of the hook 23 is about 3 inches long, about 2 inches wide and about ⅛ inch thick. The leg member 52 of the hook 23 is about 6 inches long, 1½ inches wide and about ⅛ inch thick. Although it is preferably made of steel, the handle 10 can be made of other durable materials as well including hard plastic, aluminum, or a combination of such materials.

Figure 4:
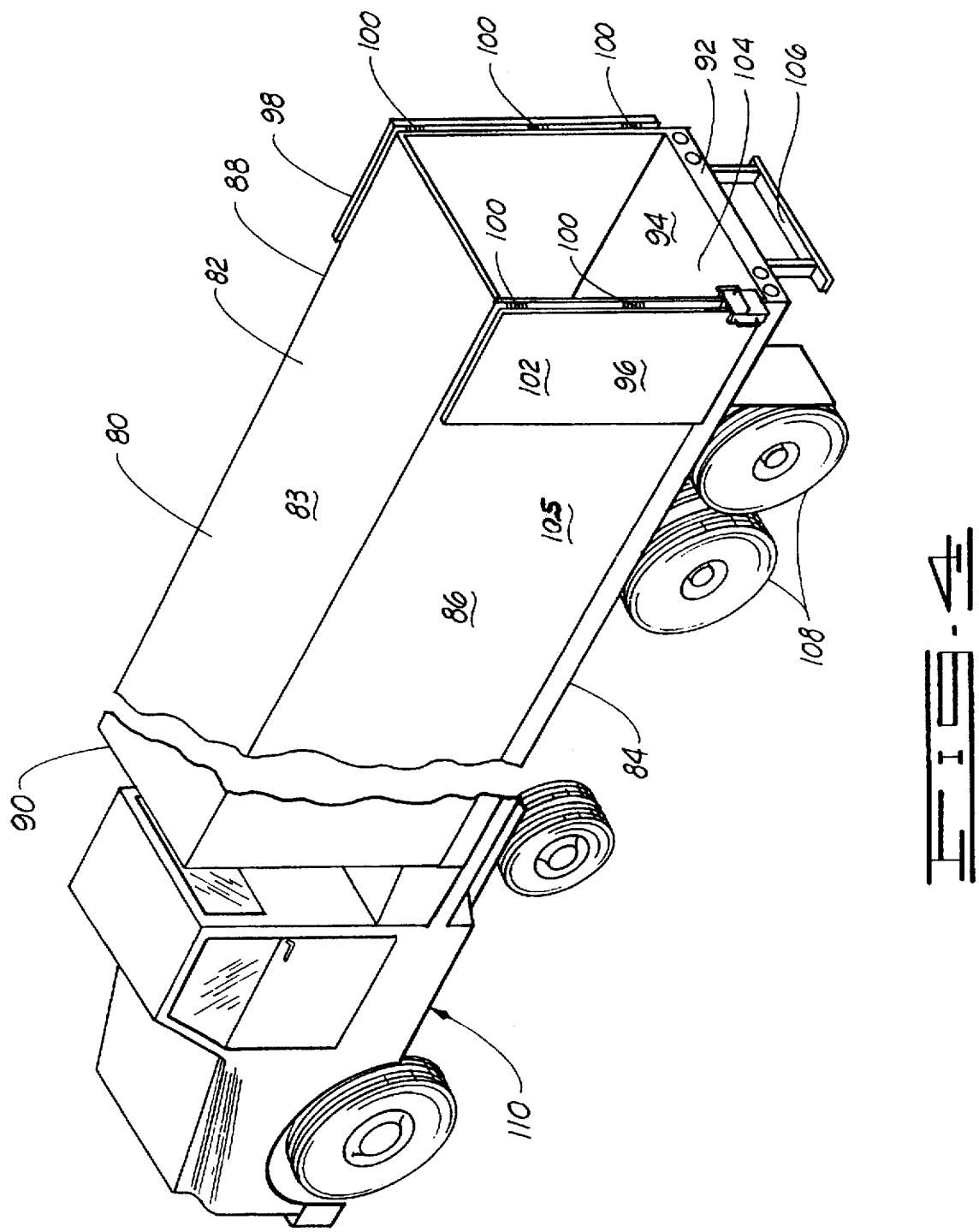
FIG. 4 is a view illustrating use of the embodiment of the inventive handle illustrated by FIG. 1 in association with a cargo door of a large van trailer.

Referring now in particular to FIGS. 4–6, use of the inventive portable handle to facilitate entry into and exit from a van trailer will be described.

FIG. 4 illustrates a typical enclosed van trailer. The trailer 80 includes a trailer body 82 that includes a top 83, a bottom 84, a pair of sidewalls 86 and 88, a front end 90, a rear end 92, a floor 94 and a pair of cargo doors 96 and 98. The doors 96 and 98 are vertically and pivotally mounted (the doors pivot on a vertical axis) to the sidewalls 86 and 88, respectively, by a plurality of hinge units 100. The cargo doors 96 and 98 come together to form a rear wall 102 of the trailer body 82 and enclose the interior 104 of the trailer. Each of the doors 96 and 98 swings open to a position adjacent the outside surface 105 of the corresponding sidewall 86 or 88. The trailer also includes a rear bumper 106 and a wheel assembly 108. The trailer is connected to a tractor 110 and is hauled thereby.

As used herein, a hinge unit means a jointed or flexible device on which a corresponding door turns, swings or moves. One type of hinge unit includes a pair of hinge leaves, each with one or more matching cylindrical collars. A hinge pin extends through the collars to hold the hinge leaves together.

In loading and unloading the van trailer 80, the rear end 92 of the trailer is typically backed up to a loading dock (not shown) such that the floor 94 of the trailer is substantially flush with the top surface of the loading dock. This allows direct and easy access into the interior 104 of the trailer 80.

As discussed above, gaining access to the interior 104 of the trailer 80 in the absence of a loading dock can be a difficult and dangerous task. The inventive handle 10 facilitates entry into and exit from the interior 104 of the trailer 80 by providing three different handle members 26, 60 and 62 that the user can hold on to while climbing in and out of the trailer. The user can temporarily couple the handle 10 to the trailer 80 in an ideal position adjacent an open door. For example, as best shown by FIGS. 5 and 6, the user can merely insert the leg member 52 of the hook 23 of the handle 10 between the inside surface 112 of the open door 96 and the outside surface 105 of the side wall 86 of the trailer body 82 such that the leg member 52 extends over and behind the lowermost hinge unit 100 (hinge unit 100(a)) attached to the door 96. The hinge unit 100(a) (e.g., the cylindrical collar portion thereof) fits into the space 54 between leg member 52 and the inside surface 18 of the center member 30 of the base 12. The leg member 52 abuts against the rear of the hinge unit 100(a) (e.g., the collar portion) and the extension member 50 rests on the top of the hinge unit 100(a) (e.g., the collar portion) to hold the handle 10 in place. The handle 10 assumes an obstructing position in the space between the side wall 86 and the door 96 of the trailer 80 thereby holding the door 96 open. The arm members 32 and 34 further hold the handle 10 in position. The arm member 32 holds the door 96 against the outside surface 105 of the sidewall 86. When the handle is positioned on the other side of the truck, the arm member 34 holds the door 98 against the outside surface 105 of the sidewall 88. In this way, the handle maintains the involved door in the fully open position regardless of wind, spring tension and so forth.

In climbing in and out of the trailer, the user can grasp one or more of the handle members 26, 60 and 62 to balance himself or herself while stepping on to the rear bumper 106 and into the trailer or on to the rear bumper 106 and onto the ground as the case may be. The handle 10 can be similarly positioned with respect to other doors in trailer side walls.

The inventive handle 10 is rugged in construction, inexpensive to manufacture, and simple to use. The handle 10 can be stored in the tractor 110 when not in use.

Thus, the present invention is well adapted to carry out the objects and attain the ends and advantages mentioned as well as those which are inherent therein. While numerous changes to the portable handle of this invention may be made by those skilled in the art, such changes are encompassed within the spirit of this invention as defined by the appended claims.

What is claimed is:

1. A portable handle for facilitating entry into and exit from a trailer comprising:

a base including a center member, at least one arm member attached to said center member and extending outwardly from said center member, a top, a bottom, an inside surface and an outside surface;

a hook for removably hooking said base to a trailer, said hook including an extension member attached to said inside surface of said base adjacent the top thereof and extending outwardly therefrom, and a leg member attached to and extending from said extension member toward the bottom of said base, said leg member being spaced from said inside surface of said base, said arm member of said base extending outwardly from said center member of said base alongside said leg member; and at least one handle member attached to the outside surface of said base.

2. The portable handle of claim 1 wherein said at least one handle member comprises two handle members attached to the outside surface of said base consisting of a first handle member attached to the outside surface of said center member and a second handle member attached to the outside surface of said at least one arm member.

3. The portable handle of claim 2 wherein said first and second handle members are each a U-shaped rod having a pair of spaced legs and a cross bar interconnecting said legs, said legs of said first handle member being attached to the outside surface of said center member and said legs of said second handle member being attached to the outside surface of said at least one arm member.

4. A portable handle for facilitating entry into and exit from a trailer comprising:

a base including a center member, a pair of spaced arm members attached to said center member and extending outwardly from said center member, a top, a bottom, an inside surface and an outside surface;

a hook for removably hooking said base to a trailer, said hook including an extension member attached to said inside surface of said base adjacent the top thereof and extending outwardly therefrom, and a leg member attached to and extending from said extension member toward the bottom of said base, said leg member being spaced from said inside surface of said base, said arm members extending outwardly from said center member alongside said leg member such that said hook is positioned between said arm members and is partially encased by said base; and at least one handle member attached to the outside surface of said base.

5. The portable handle of claim 4 wherein said at least one handle member comprises two handle members attached to the outside surface of said base consisting of a first handle member attached to the outside surface of said center member and a second handle member attached to the outside surface of one of said arm members.

6. The portable handle of claim 4 wherein said at least one handle member comprises three handle members attached to the outside surface of said base consisting of a first handle member attached to the outside surface of said center member, a second handle member attached to the outside surface of a first one of said arm members and a third handle member attached to the outside surface of the second one of said arm members.

7. The portable handle of claim 6 wherein said first, second and third handle members are each a U-shaped rod having a pair of spaced legs and a cross bar interconnecting said legs, said legs of said first handle member being attached to the outside surface of said center member, said legs of said second handle member being attached to the outside surface of said first one of said arm members and said legs of said third handle member being attached to the outside surface of said second one of said arm members.

8. The portable handle of claim 4 wherein said center member and said arm members of said base are each a flat rectangular plate having a pair of opposed ends and have the same length from top to bottom, and wherein an end of each of said arm members is attached to an end of said center member.

9. The portable handle of claim 8 wherein said center member and said arm members of said base are integrally formed together as a one-piece unit.

10. A portable handle for facilitating entry into and exit from the interior of a trailer of a type having a body and at least one door pivotally mounted to the body by at least one hinge unit, comprising:

a base including a top, a bottom, an inside surface and an outside surface;

a hook attached to said inside surface of said base and extending outwardly therefrom, said hook adapted to be removably placed over the hinge unit of the trailer for temporarily coupling said base to the trailer when the door of the trailer is open, said hook including:

an extension member attached to said inside surface of said base adjacent the top thereof and extending outwardly therefrom;

a leg member attached to and extending from said extension member toward the bottom of said base, said leg member being sufficiently spaced from said inside surface of said base to form a space large enough to receive said hinge unit; and at least one handle member attached to the outside surface of said base.

11. The portable handle of claim 10 wherein said at least one handle member is a U-shaped rod having a pair of spaced legs attached to said outside surface of said base and a cross bar interconnecting said legs.

12. A portable handle for facilitating entry into and exit from the interior of a trailer of a type having a body and at least one door pivotally mounted to the body by at least one hinge unit, comprising:

a base including a center member, a pair of spaced arm members attached to said center member and extending outwardly from said center member, a top, a bottom, an inside surface and an outside surface;

a hook attached to said inside surface of said base and extending outwardly therefrom, said hook adapted to be removably placed over the hinge unit of the trailer for temporarily coupling said base to the trailer when the door of the trailer is open, said hook including:

an extension member attached to said inside surface of said base adjacent the top thereof and extending outwardly therefrom; and a leg member attached to and extending from said extension member toward the bottom of said base, said leg member being spaced from said inside surface of said base, said arm members extending outwardly from said center member alongside said leg member such that said hook is positioned between said arm members and is partially encased by said base; and at least one handle member attached to the outside surface of said base.

13. The portable handle of claim 12 wherein said at least one handle member comprises two handle members attached to the outside surface of said base consisting of a first handle member attached to the outside surface of said center member and a second handle member attached to the outside surface of one of said arm members.

14. The portable handle of claim 12 wherein said at least one handle member comprises three handle members attached to the outside surface of said base consisting of a first handle member attached to the outside surface of said center member, a second handle member attached to the outside surface of a first one of said arm members and a third handle member attached to the outside surface of the second one of said arm members.

15. The portable handle of claim 14 wherein said first, second and third handle members are each a U-shaped rod having a pair of spaced legs and a cross bar interconnecting said legs, said legs of said first handle member being attached to the outside surface of said center member, said legs of said second handle member being attached to the outside surface of said first one of said arm members and said legs of said third handle member being attached to the outside surface of said second one of said arm members.

16. The portable handle of claim 12 wherein said center member and said arm members of said base are each a rectangular flat plate having a pair of opposed ends and have the same length from top to bottom, and wherein an end of each of said arm members is attached to an end of said center member.

17. The portable handle of claim 16 wherein said center member and said arm members of said base are integrally formed together as a one-piece unit.

18. A portable handle for facilitating entry into and exit from the interior of a van trailer of a type having a body and at least one door pivotally mounted to the body by at least one hinge unit, comprising:

a base including a center member, a pair of spaced arm members attached to said center member and perpendicularly extending outwardly from said center member, a top, a bottom, an inside surface and an outside surface;

a hook positioned between said arm members and partially encased by said base, said hook being adapted to be removably placed over a hinge unit of a trailer for temporarily coupling said base to the trailer when the door of the trailer is open, said hook including:

an extension member attached to the inside surface of said center member adjacent the top of said center member and extending outwardly from said center member; and a leg member attached to and perpendicularly extending from said extension member toward the bottom of said center member, said leg member being spaced from said inside surface of said center member; and at least one handle member attached to the outside surface of said base.

19. The portable handle of claim 18 wherein said handle member is a U-shaped rod having a pair of spaced legs attached to said outside surface of said base and a cross bar interconnecting said legs.

20. The portable handle of claim 18 wherein said at least one handle member comprises two handle members attached to the outside surface of said base consisting of a first handle member attached to the outside surface of said center member and a second handle member attached to the outside surface of one of said arm members.

21. The portable handle of claim 18 wherein said at least one handle member comprises three handle members attached to the outside surface of said base consisting of a first handle member attached to the outside surface of said center member, a second handle member attached to the outside surface of a first one of said arm members and a third handle member attached to the outside surface of the second one of said arm members.

22. The portable handle of claim 21 wherein said first, second and third handle members are each a U-shaped rod having a pair of spaced legs and a cross bar interconnecting said legs, said legs of said first handle member being attached to the outside surface of said center member, said legs of said second handle member being attached to the outside surface of said first one of said arm members and said legs of said third handle member being attached to the outside surface of said second one of said arm members.

23. The portable handle of claim 18 wherein said center member and said arm members of said base are each a rectangular flat plate having a pair of opposed ends and have the same length from top to bottom, and wherein an end of each of said arm members is attached to an end of said center member.

24. The portable handle of claim 23 wherein said center member and said arm members of said base are integrally formed together as a one-piece unit.

* * * * *